Dec. 21, 1965     I. R. BARR     3,224,821
BALL BEARING
Original Filed April 16, 1959

IRWIN R. BARR
INVENTOR

BY

ATTORNEY

United States Patent Office 3,224,821
Patented Dec. 21, 1965

3,224,821
BALL BEARING
Irwin R. Barr, Lutherville, Md., assignor to Aircraft Armaments, Inc., Cockeysville, Md., a corporation of Maryland
Original application Apr. 16, 1959, Ser. No. 806,899, now Patent No. 3,089,221, dated May 14, 1963. Divided and this application July 17, 1962, Ser. No. 210,536
5 Claims. (Cl. 308—187.2)

This invention relates to ball bearings, and more particularly to, ball bearings especially suited for portable conveyors.

This application is a division of applicant's co-pending application, Serial Number 806,899, filed April 16, 1959, now U.S. Patent Number 3,089,221.

Portable conveyors used to facilitate material handling generally employ a number of cylindrical rollers mounted on a frame. To insure free rotation of the rollers, ball bearings are inserted in the ends thereof. Because of the large number of bearings required in a given conveyor section, and the fact that there is no requirement for precision, unground bearings are used since they are the least expensive. In such bearings, either or both the rings may be stamped out of sheet metal. The shapes are such that the balls may be placed in the race in either ring, and the other ring assembled thereon. A sheet metal cover is then permanently rolled onto the assembly to retain the balls, which then serve to prevent separation of the rings under axial bearing loads. The necessity for seating the balls in a raceway having a radial dimension in excess of the clearance between the rings so as to prevent separation of the rings, requires either a three-piece bearing, or at the very least, swaging of one ring to close the ball clearance opening.

Since these operations may be carried on efficiently and at relatively low cost by conventional metal handling equipment, the bearings so formed are relatively inexpensive. However, their use in portable conveyors creates a number of problems. In a damp environment, corrosion quickly occurs in the races and on the balls causing a rapid increase in friction. When it is considered that there is a habitual failure to maintain bearings of the class described by periodic inspection and lubrication, it will be appreciated that frequent bearing replacement is required.

In addition to the susceptibility of bearings of the class described to damage by moisture, the absence of seals permits abrasive elements from the atmosphere to enter the grooves and quickly cause bearing failure. The use of sealed, lubricated bearings would prevent this latter described failure, but such bearings are considerably more expensive than unground bearings. Furthermore, even sealed bearings are not suitable in installations where steam or solvents are used to clean the conveyor rollers, as for example in food processing plants and the like. Under these conditions, the lubricant is soon melted away and corrosion is not prevented but only postponed.

Much effort has been expended by those skilled in the art to provide a bearing of the class described which, although inexpensive, will neither corrode nor be affected by abrasives, but so far as is known, no successful bearing of the class described has yet been contributed, and the problems set forth above remain unsolved. It is an object of this invention to provide a bearing which can be used in a damp environment containing abrasive elements and which does not require either an extra part or swaging to maintain the rings against separation.

As a feature of this invention by which the objects thereof are achieved, the inner and outer rings of the bearings as well as the balls, are formed of a plastic composition which has high impact strength and a low coefficient of friction such that lubrication is unnecessary. By forming on the outer ring an integral web which extends toward and engages the inner ring, and by making this web sufficiently thin in section, a seal is formed which resiliently engages the inner ring and seals the raceway containing the balls from abrasive elements exterior to the bearing. Because of the relatively large deflection of the rings and balls which may occur within the elastic limit of the plastic composition, there is no necessity for providing ball clearance in the rings. The balls may be inserted by pressing them in an axial direction into the clearance between the rings causing radial deformation thereof sufficient to temporarily increase the clearance and effect passage of the balls into the raceway defined by the rings. As the balls seat in the raceway, the clearance returns to its original value. Separation of the rings can, therefore, occur only when axial thrust loads applied to the balls causes radial deflection of the rings sufficient to recreate the ball insertion clearance. While the axial load required to recreate the ball clearance is generally relatively high, further resistance to separation is obtained after the bearing is mounted and all radial deflection of the rings is constrained by the mounting.

In some applications, it may be necessary to have a seal on both faces of the bearing thereby precluding axial insertion of the balls in the manner set forth above. In such case, the outer ring may be made in two symmetrical parts and held in place by a housing which is radially deformable within the elastic limit of the material as the parts are inserted therein. Separation of the various parts of this bearing is prevented in the same manner as in the previously described bearing.

Still other objects and attendant advantages will become apparent to one skilled in the art from a reading of the following detailed description of several physical embodiments constructed in accordance with the invention, taking in conjunction with the accompanying drawings.

Figure 2:
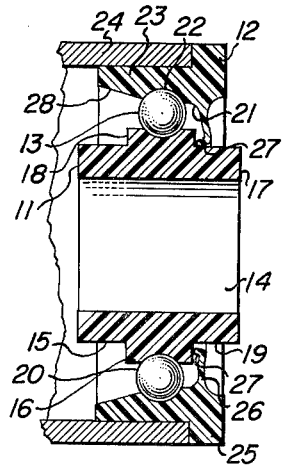
FIGURE 2 is a view in section showing the bearing of FIGURE 1 mounted in a conveyor roller.
Figure 2A:
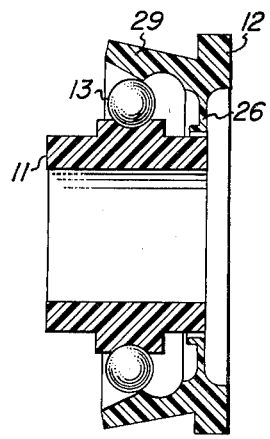
Figure 2B:
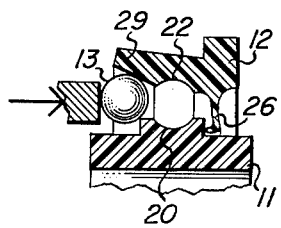

FIGURES 2(a) and 2(b) show two methods by which the balls may be inserted into the bearing rings.

Figures 3, 3A, 4:
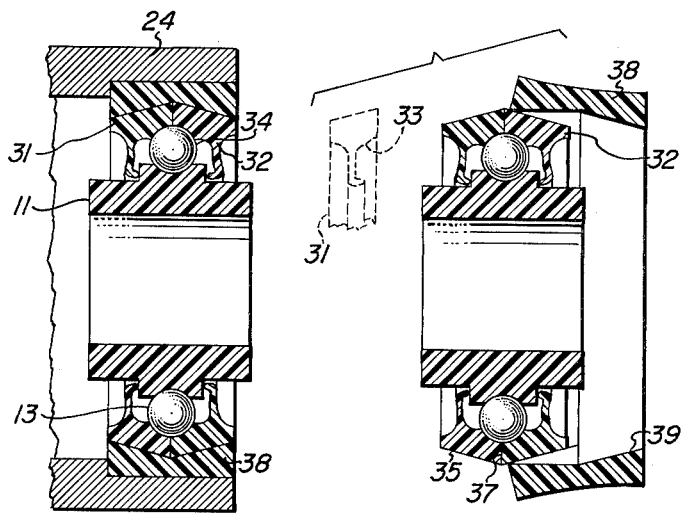

FIGURE 3 is a view similar to that of FIGURE 2 but showing another embodiment of the invention.

FIGURE 3(a) shows a method of assembling the bearing of FIGURE 3.

FIGURE 4 is a section view of still another embodiment of the invention.

Figure 1:
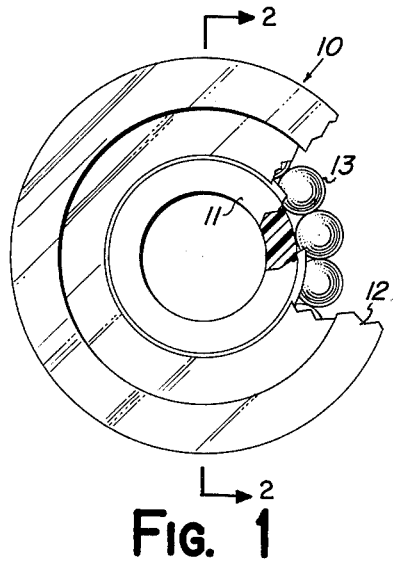
FIGURE 1 shows a front view of a bearing made in accordance with the invention with parts broken away.

Referring now to FIGURES 1 and 2, a bearing made in accordance with the invention is shown generally at 10 and has inner ring 11, outer ring 12, and balls 13, each of which are formed from a thermoplastic polymer by an injection molding process. A suitable plastic material which possesses high impact strength is a polycarbonate resin manufactured by the General Electric Company and known commercially as "Lexan."

Inner ring 11 has an axial bore 14 and a generally cylindrical outer surface 15 having thereon a portion 16 of enlarged diameter. End faces 17 are normal to the axis of ring 11, as are circumferential shoulders 18 which connect portion 16 with the reduced portion 19. A radially outwardly open semicircular groove 20 is provided in portion 16 intermediate shoulders 18. Groove 20 forms the inner race for balls 13.

Outer ring 12 has generally cylindrical inner surface 21 containing a radially inwardly open semicircular groove 22 which forms the outer race for balls 13 when the rings are in concentric arrangement. That is, groove 22 in ring 12 is aligned with groove 20 in ring 11 to form a torroidal raceway of uniform cross-section which is of a dimension substantially the same as the diameter of balls 13. Consequently, when the balls are in the raceway, they allow the outer ring to be rotated with respect to the inner ring with very little frictional resistance. The nominal annular opening between the outer surface of portion 16 and inner surface 21 is smaller than the radial dimension of the raceway (and the ball diameter) so that once the balls are in the raceway, they serve to prevent axial separation of the rings. This arises because there is insufficient clearance between the rings for the balls to move axially with respect thereto under the influence of axial loads.

Ring 12 has a cylindrical outer surface 23 which may be press fitted in the interior of hollow cylindrical roller 24. Flange 25 defined by a face normal to the axis of the bearing serves to limit insertion of bearing 10 in roller 24 and to correctly align the axis of the bearing with the axis of the roller.

Adjacent the face defining flange 25 on outer ring 12 is integral circumferential web 26 which extends radially toward inner ring 11 and terminates in free end 27. Web 26 is formed on ring 12 so that in its unflexed position, it is substantially normal to the axis of the bearing as shown in FIGURE 2(a), and is of relatively thin section. When groove 20 is aligned with groove 22, free end 27 engages shoulder 18 and is axially deflected from its unflexed position to the position shown in FIGURE 2. This deflection is within the elastic limit of the plastic material so that end 27 is resiliently urged into engagement with shoulder 18 to form a seal that protects the interior of the bearing from abrasive elements exterior to the bearing. By tapering end 27, a very small area of contact with shoulder 18 is produced thereby limiting friction between the rings due to the seal. Such friction may also be controlled by adjusting the amount of axial deflection of web 26 due to the spacing of the web from the groove.

Inner surface 21 of outer ring 12 has a portion 28 which diverges from groove 22 toward the end face opposite to flange 25. The purpose for this conical shaped portion will be apparent hereinafter, suffice it to say that the angle is not critical. It should be noted that there is no clearance in the annular opening between the rings to provide for insertion of balls 13. Such clearance is not necessary because of the novel manner in which the resiliency of the plastic material is employed during bearing assembly.

Reference is now made to FIGURE 2(a) which shows balls 13 seated in groove 20 of inner ring 11 before outer ring 12 is assembled to form the complete bearing. Ring 12 is moved axially onto the configuration until portion 28 contacts the surface of balls 13. As axial pressure is applied to ring 12, it moves axially while balls 13 and inner ring 11 are constrained. Flange 29 deflects or deforms radially outwardly from its rest position substantially parallel with the bearing axis, as is illustrated in FIGURE 2(a). This radial enlargement or deformation occurs within the elastic limit of the material. Eventually, the edge of groove 22 snaps over balls 13 which are then seated in the torroidal raceway defined by grooves 20 and 22. Flange 29 simultaneously moves radially inwardly from its deflected position to its rest position as the result of the internal strain energy contained within the flange. Those skilled in the art will appreciate that FIGURE 2(a) is illustrative of the principle of the method for assembling the elements of the bearing and various forms and jigs for retaining the balls in the raceway and the ring against movement have been eliminated for purposes of clarity.

After balls 13 are seated in the grooves, the races may be rotated relative to each other, but cannot be separated. Axial pressure applied to inner ring 11 tends to cam balls 13 in the raceway and cause flange 29 to deflect radially outwardly, increasing the annular clearance between the rings. However, since a more steeply inclined surface is presented to the ball, substantially more pressure is required to separate the rings than is necessary to assemble the same. Moreover, after surface 23 is fitted into roller 24, flange 29 is constrained against radial movement to the position shown in FIGURE 2(a). Thus, the bearing will resist axial loads until the axial pressure brinells the races.

Another manner of inserting balls 13 into the raceway is illustrated in FIGURE 2(b) wherein outer ring 12 is concentrically positioned with respect to ring 11 and grooves 20 and 22 are in alignment. Balls 13 are simply forced into the annular opening between the rings, with surface 28 serving to help cam flange 29 to the position shown in the drawing. Balls 13 will eventually snap over the edges of grooves 20 and 22 and into the raceway defined thereby, whereupon flange 29 will return to its rest position.

A second embodiment of the invention is shown in FIGURE 3 and illustrated a bearing having each face sealed against abrasive elements. Here, the inner ring 11 is identical with the ring previously described. However, in this embodiment, the outer ring comprises ring segments 31, 32. Each segment is generally a hollow frustro-conical body whose base 37 is substantially perpendicular to the axis. The interior edges of segments 31, 32 adjacent base 37 are defined by quarter circular grooves 33, 34 whose centers lie in the plane of base 37. When bases 37 of the segments are abutted and the axes thereof are coincident with the axis of ring 11, grooves 33, 34 and 20 define a torroidal raceway whose maximum radial dimension lies in the plane of bases 37. The diameter of balls 13 is substantially that of the maximum radial dimension.

Adjacent grooves 33, 34, and on the interior of rings 31, 32 are circumferential webs 26' which are similar to webs 26 of the embodiment of FIGURE 2, and extend radially into engagement with shoulders 18 on ring 11 to form a double seal. The rest position of webs 26' is in a plane substantially parallel to the plane of bases 37 and when the segments are in the position described above, webs 26' are deflected so as to cause them to remain in resilient engagement with shoulders 18.

With bases 37 abutting, and balls 13 installed in the raceway, the maximum outside diameter of rings 31, 32 occurs in the plane of bases 37. The diameter of each ring decreases uniformly toward the end face opposite to base 37. Surrounding rings 31, 32 is a generally cylindrical housing 38 that is apertured to provide an inner surface 39 corresponding to the outside surface of rings 31, 32 and shown in FIGURE 3. Once so assembled, balls 13 serve to effect relative rotation between the inner and outer rings and to prevent their separation.

To assemble the embodiment illustrated in FIGURES 3 and 3(a), balls 13 are first placed in the groove in inner ring 11. Next, ring segments 31, 32 are placed in position from opposite ends of the inner ring until bases 37 abut, and the quarter circular grooves 33, 34 cooperate to define the outer raceway for the balls. The described configuration is then inserted into the aperture housing 38. Relative axial movement of the configuration with respect to the housing causes radial deflection of the housing due to the maximum diameter of the configuration acting upon the housing as illustrated in FIGURE 3(a). This deflection is within the elastic limit of the material of the housing so that when the configuration is entirely contained within the housing, it regains its rest shape. It may thereafter be inserted into a counter bored recess in roller 24.

Separation of the various elements of the bearing due to axial loads applied to the inner race is prevented because radial deformation of housing 38 sufficient to provide clearance for removing rings 31, 32 therefrom is prevented by roller 24 as shown in FIGURE 3. To facilitate insertion into the housing the internal edges on housing 38 may be rounded.

By decreasing the diameter of each of the above described rings non-uniformly toward the end face opposite to base 37, the exterior surface of the rings may be made spherical and the embodiment shown in FIGURE 4 results. The interior surface of housing 41 is made spherical to match the spherical exterior of configuration 40. In this manner, an extremely simple self-aligning bearing is achieved.

Those skilled in the art will appreciate that this invention provides an inexpensive bearing well adaptable to be mass produced by conventional injection molding methods. Furthermore, the bearing elements so produced may be assembled in a novel manner such that there need to be provision for ball clearance. The bearing so formed needs no lubrication and is protected against abrasive elements by a novel seal formed on the outer ring during the molding process.

What is claimed is:

1. An anti-friction bearing comprising an inner ring having a permanent pre-assembly-formed annular groove in its outer surface, an outer ring having a permanent pre-assembly-formed annular groove in its inner surface facing and aligned with said inner ring groove and forming a raceway therewith, anti-friction rolling elements complementary to and disposed in said raceway, said outer ring being of an elastic material which is deformable within the elastic limit thereof for effecting insertion of said anti-friction rolling elements into said raceway, and an annular constraining sleeve fitted about the outer circumferential periphery of said outer ring, said annular sleeve being formed of a materially stiffer material than that of said outer ring and of sufficient stiffness to prevent dislodgement of said anti-friction rolling elements by radial elastic deformation of said outer ring, one of said rings having an end shoulder face formed thereon adjacent its respective said annular groove, the other of said rings having a radially extending shield formed integral therewith, said shield having an annular lateral bend terminating in an annular lip extending longitudinally toward and into deflected resilient sealing engagement with said end shoulder face of said one ring.

2. An anti-friction bearing comprising an inner ring having an annular groove in its outer surface, an outer ring formed of two interfacing segments each of which segments has a complementary interfacing grooved portion forming a combined radially inner facing annular groove facing and aligned with said inner ring groove and forming a raceway therewith, anti-friction rolling elements disposed in said raceway, each of said ring segments having a circumferentially outer tapered surface which is of larger circumference at the axially interfacing edges of said segments than at the axially outerfacing edges thereof and thereby forming a combined convexly shaped radially outer circumferential surface, an elastic annulus having a concave radially inner facing annular surface complementary to said combined convexly shaped radially outer circumferential surface of said two ring segments, said annulus being of an elastic material of sufficient elasticity to permit elastic flexing enlargement thereof to slide over and into seated astride position on said combined ring segments, said annulus having a substantially straight cylindrical outer periphery as seated astride said combined ring segments, and a unitary annular constraining sleeve having a substantially straight cylindrical inner peripheral surface substantially complementary to and axially slidably fitted about the outer circumferential periphery of said elastic annulus, said annular sleeve being formed of a materially stiffer material than that of said annulus and of sufficient stiffness to prevent dislodgment of said ring segments and anti-friction rolling elements from within said elastic annulus by radial elastic deformation of said elastic annulus.

3. A bearing according to claim 2 wherein the taper of said tapered outer circumferential surfaces of said ring segments is linear to thereby form a frusto-conical tapered outer surface on each of said ring segments.

4. A bearing according to claim 2 wherein the taper of said tapered outer circumferential surfaces of said ring segments is non-linear and such that the tapered surface forms a portion of an imaginary sphere having a center of curvature lying substantially on the longitudinal axis of rotation of said outer ring segments, said concave inner facing annular surface of said annulus having a complementary spherical shape whereby said annulus serves both as a removable elastic endwise retaining element for said ring segments and as a self-aligning spherical seat for said ring segments.

5. A bearing according to claim 2 wherein each of said ring segments has a circumferential shield integral therewith an dextending into resilient sealing engagement with a respective end face of said inner ring.

References Cited by the Examiner

UNITED STATES PATENTS

| 920,149 | 5/1909 | James | 308—196 |
| 1,439,901 | 12/1922 | Knowles | 308—196 |
| 1,492,672 | 5/1924 | Brunner | 308—196 |
| 2,439,269 | 4/1948 | Shafer | 308—184 |
| 2,814,538 | 11/1957 | Connolly | 308—72 |
| 2,845,285 | 7/1958 | Cobb | 308—187.2 X |
| 2,873,131 | 2/1959 | Leister | 308—194 X |
| 2,955,884 | 10/1960 | Marshall | 308—190 |
| 2,995,405 | 8/1961 | Ferdig | 308—190 |
| 3,068,551 | 12/1962 | Cobb | 308—72 X |

FOREIGN PATENTS 730,426 5/1955 Great Britain.

DON A. WAITE, *Primary Examiner.*

FRANK SUSKO, ROBERT C. RIORDON, *Examiners.*